United States Patent [19]

Barley et al.

[11] 4,322,111
[45] Mar. 30, 1982

[54] VEHICLE SEATS

[75] Inventors: Geoffrey W. Barley, Kislingbury; David Moorhouse, Blackthorn, both of England

[73] Assignee: UOP Inc., Des Plaines, Ill.

[21] Appl. No.: 86,989

[22] Filed: Oct. 22, 1979

[30] Foreign Application Priority Data

Nov. 18, 1978 [GB] United Kingdom ............... 45173/78

[51] Int. Cl.³ ................................................ A47C 1/00
[52] U.S. Cl. ..................................... 297/357; 297/408
[58] Field of Search ............... 297/357, 408, 394, 397, 297/403

[56] References Cited

U.S. PATENT DOCUMENTS

| 942,603 | 12/1909 | Undeland | 297/408 |
|---|---|---|---|
| 2,831,530 | 4/1958 | Chiopelas et al. | 297/397 |
| 3,429,615 | 2/1969 | Belk | 297/397 X |
| 3,572,831 | 3/1971 | Barecki | 297/403 |
| 4,113,310 | 9/1978 | Kapanka | 297/408 |

FOREIGN PATENT DOCUMENTS

| 2856723 | 7/1979 | Fed. Rep. of Germany | 297/408 |
|---|---|---|---|
| 2258284 | 8/1975 | France | 297/397 |

Primary Examiner—Francis K. Zugel
Attorney, Agent, or Firm—James R. Hoatson, Jr.; Barry L. Clark; William H. Page, II

[57] ABSTRACT

A seat, in particular for a tractor, has a shoulder support mounted at the upper end of a backrest of the seat on a hinge device. The hinge device, when locked, holds the shoulder support in an upright position but, when released, allows the shoulder support to be tilted downwardly to a horizontal position to support an arm and shoulder of the seat occupant when plowing or reversing the tractor.

1 Claim, 4 Drawing Figures

VEHICLE SEATS

BACKGROUND OF THE INVENTION

This invention relates to vehicle seats and particularly, but not exclusively, to tractor seats.

When a tractor driver is carrying out plowing operations or other operations in which he sits in a twisted round position within the seat, there is a need for his shoulder nearest the backrest of the seat to be given improved support.

SUMMARY OF THE INVENTION

According to the present invention there is provided a seat for a tractor or other vehicle, the seat having a backrest and a shoulder support and a hinge assembly including at least one hinge device mounting the shoulder support on the backrest for tilting movement from a normal position in which it forms an upward extension of the backrest to a backwardly-tilted position in which it forms an armrest suitable for example for supporting an arm and shoulder of the seat occupant when reversing or plowing, and releasable locking means securing the shoulder support in said normal position.

The hinge assembly can comprise two laterally spaced hinge devices each having locking means for locking the hinge device when the shoulder support is in a normal upright position, the locking means being releasable to permit the shoulder support to be tilted rearwardly about a common axis of the hinge devices to a substantially horizontal position in which it is supported by the hinge assembly.

BRIEF DESCRIPTION OF THE DRAWINGS

The invention will now be particularly described with reference to the accompanying drawings in which.

DESCRIPTION OF THE PREFERRED EMBODIMENTS

Figure 1:
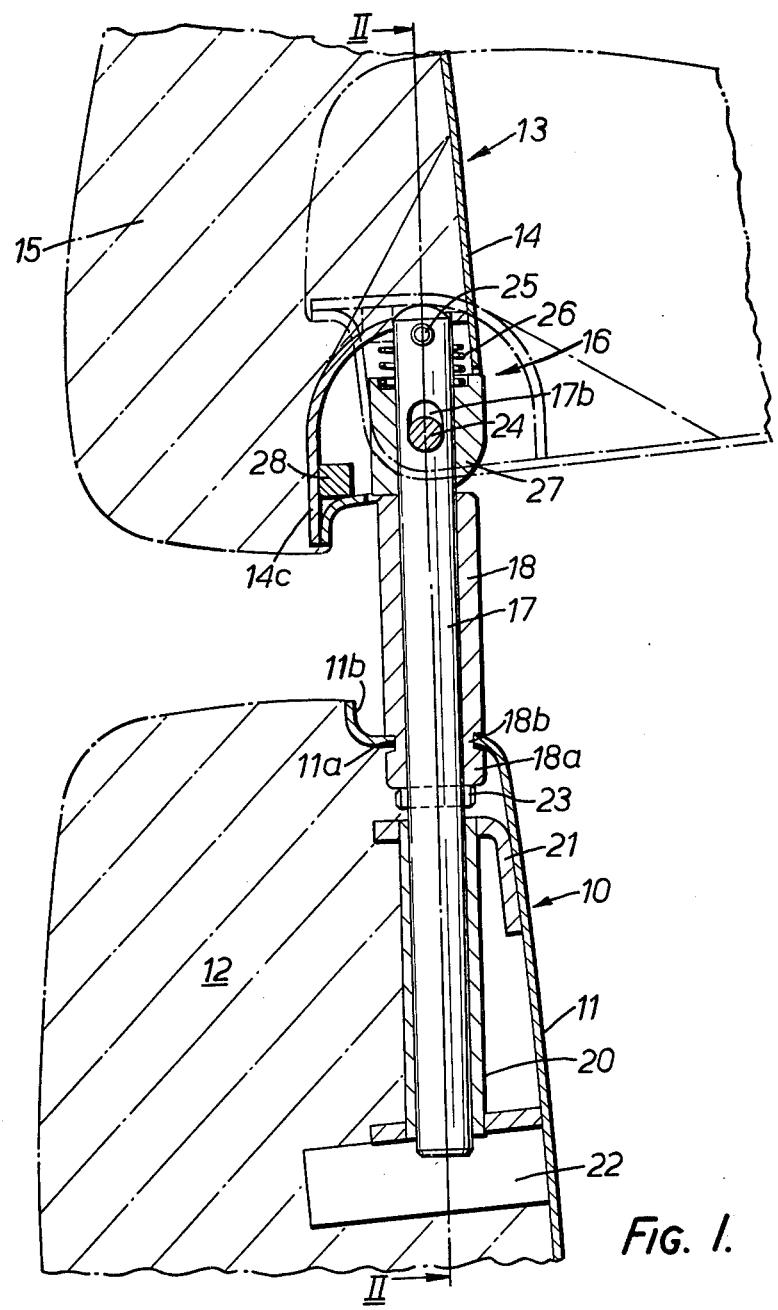
FIG. 1 is a vertical section through the backrest of a vehicle seat having a shoulder support mounted thereon.

As shown in the drawings, the backrest 10 of the vehicle comprises a backpan 11 the forward face of which is covered by upholstery 12, such as a back cushion.

A shoulder support 13 in the form of a sheet metal support pan 14 having upholstery 15 on its forward face, which likewise will normally be a plastic foam cushion, is mounted on the backrest pan adjacent the upper end thereof by means of a hinge device 16, or preferably as shown in the drawings by two similar hinge devices disposed adjacent opposite sides of the shoulder support and having a common pivot axis. The support for each hinge device includes a pillar formed by a shank 17 an upper part of which is surrounded by a locking sleeve 18 rotatably secured thereto and the lower part of which is received in a mounting secured to the backrest pan. As shown, such a mounting comprises a supporting sleeve 20 having supporting brackets 21, 22 at its upper and lower ends welded to the backrest pan.

The pillar shank 17 also extends through a pair of oval openings 11a in an upper flange of the backrest pan, the locking sleeve near its lower end, forming a bush between the pillar and the backpan flange. For this purpose, the lower end portion 18a of the locking sleeve is of oval external cross-section to pass closely through the opening. This end portion is connected to the remainder by an intermediate portion 18b of circular external diameter to fit the minimum width of the opening 11a to allow the intermediate portion of the locking sleeve to be rotated in the opening. The length of the intermediate portion corresponds to the thickness of the flange 11b of the backpan. By rotating the locking sleeve through 90° after the oval section end portion 18a has passed downwardly through the oval opening 11a, the locking sleeve 18 is locked against withdrawal. The locking sleeve 18 is prevented from sliding down the pillar shank 17 by a retaining pin 23 passing through the pillar shank immediately below the lower end portion 18a of the locking sleeve. Reverse rotation of the locking sleeve through 90° allows removal of the shoulder support from the backrest.

At the upper end of the pillar shank 17, a pivot pin 24 passes horizontally and in the direction transversely of the seat through an opening in the pillar shank, the ends of the pin being received in parallel-spaced supporting walls 14a, 14b forming part of the shoulder support pan 14. A transverse wall 14c extending between the two support walls 14a, 14b is arcuate about the axis of the pivot pin 24 through about one-quarter of a circle. This arcuate wall 14c has an opening 14d therein which receives the upper end of the pillar when the shoulder support is in a normal upright position. The upper end portion 17a of the pillar is domed to facilitate entry of the portion 17a into and removal from the aperture.

A further transverse pin 25 extends through the pillar adjacent its upper end. The pin 25 forms an abutment for the upper end of a coil spring 26 which surrounds the pillar 17 and rests at its lower end on the edge of a spacer 27 mounted on the pillar shank 17 and located by pivot pin 24. Spacer 27 is contained between the two parallel support walls 14a, 14b. The aperture 17b in the shank of the pillar through which the pivot pin 24 passes is elongated to allow sufficient movement of the pivot pin 24 relative to the pillar shank to withdraw the arcuate wall 14c from the domed end 17a of the shank. Accordingly the pivot pin 24 and transverse pin 25, the spacer 27, the coil spring 26 and the opening 14d of the arcuate wall together form a releasable locking device which secures the shoulder support in an upright position. However, the locking device is releasable by lifting the shoulder support 13 to withdraw the arcuate wall 14c from the domed upper end 17a of the pillar shank 17 and permit the shoulder support to be tilted backwardly about the axis of the pivot pin 24. The limit of this rearward movement is defined by an abutment 28 secured to the concave side of the arcuate wall which comes into abutment with the upper end of the pillar shank to prevent further backward tilting movement of the shoulder support. During the tilting movement of the shoulder support, the domed upper end 17a of the pillar 17 will be held in sliding contact with the concave face of the arcuate wall by spring 26. Thus, when the shoulder support is tilted upwardly and the opening 14d of the arcuate wall 14c has been brought again into register with the domed upper end 17a of the pillar shank, the biassing action of the spring 26 will urge the shoulder support downwardly to re-engage the upper end 17a of the pillar shank with the opening 14d of the arcuate wall 14c.

Figure 2:
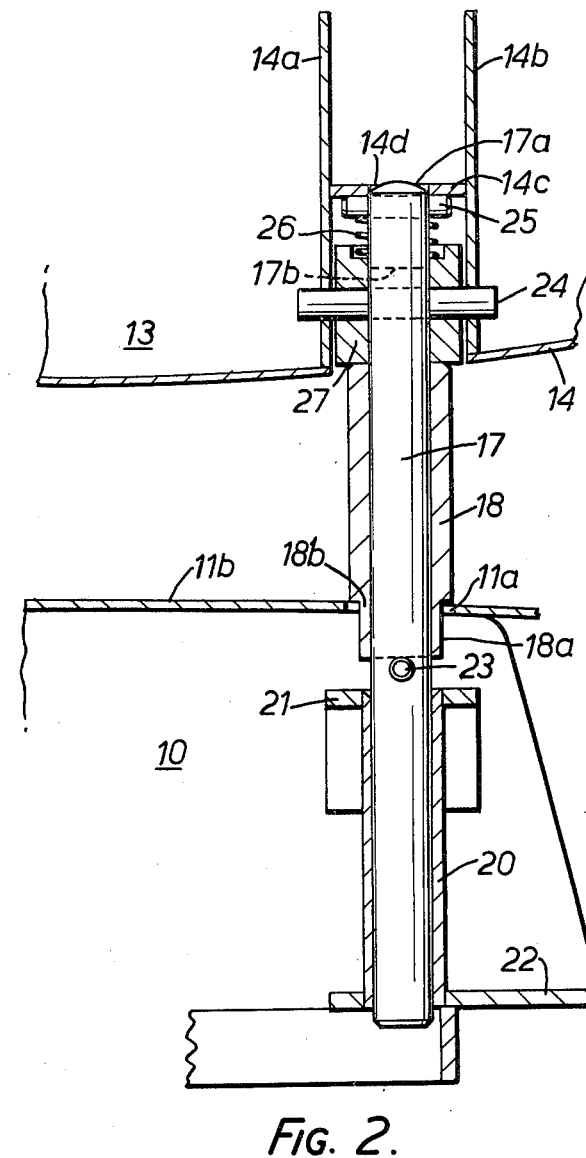
FIG. 2 is a section on the line II—II of FIG. 1, only the right-hand half of the construction being shown since the left-hand half will be a mirror image thereof.
Figure 3:
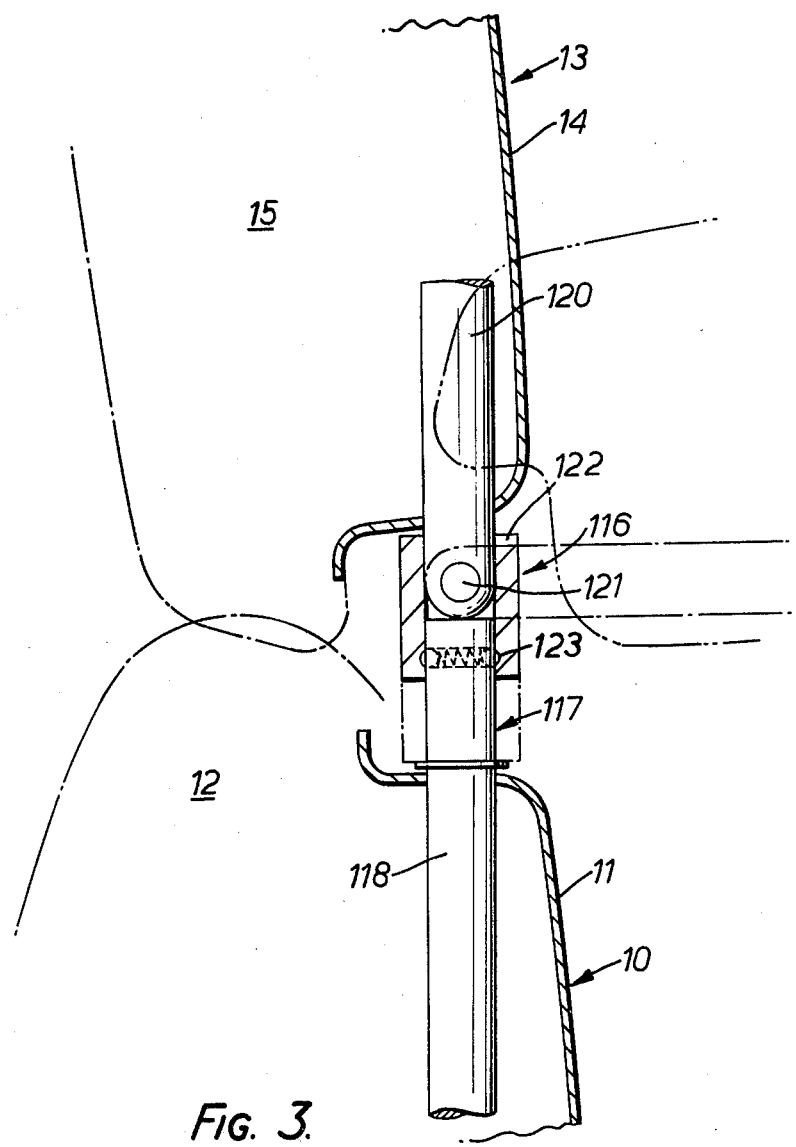
FIGS. 3 and 4 are diagrammatic views, corresponding to that of FIG. 1, of second and third embodiments respectively of the invention.

In the modified embodiment of FIG. 3, (in which like parts are referred to by the reference numerals used on FIGS. 1 and 2), the shoulder support 13 is mounted on the backrest 10 by a hinge device 116 comprising a pair of laterally spaced pillar shanks 117 of which only one is shown. Each pillar 117 has a lower circular-section shank portion 118 supported on the backrest, an upper circular-section shank portion 120 secured to the shoulder support and hinged at 121 to the lower shank portion, and a rigid sleeve 122 which fits closely around the pillar shank 117. The sleeve is slidable along the pillar shank from a first position, shown in full line in FIG. 3, in which it embraces the adjacent parts of both the upper and lower shank portions 118, 120 to lock the hinge 121 against operation, to a second position, shown in dotted line, in which it is clear of the upper shank portion and so leaves the shoulder support 13 free for pivotal movement. A sprung detent 123 is operative to secure the sleeve in the upper position.

Figure 4:
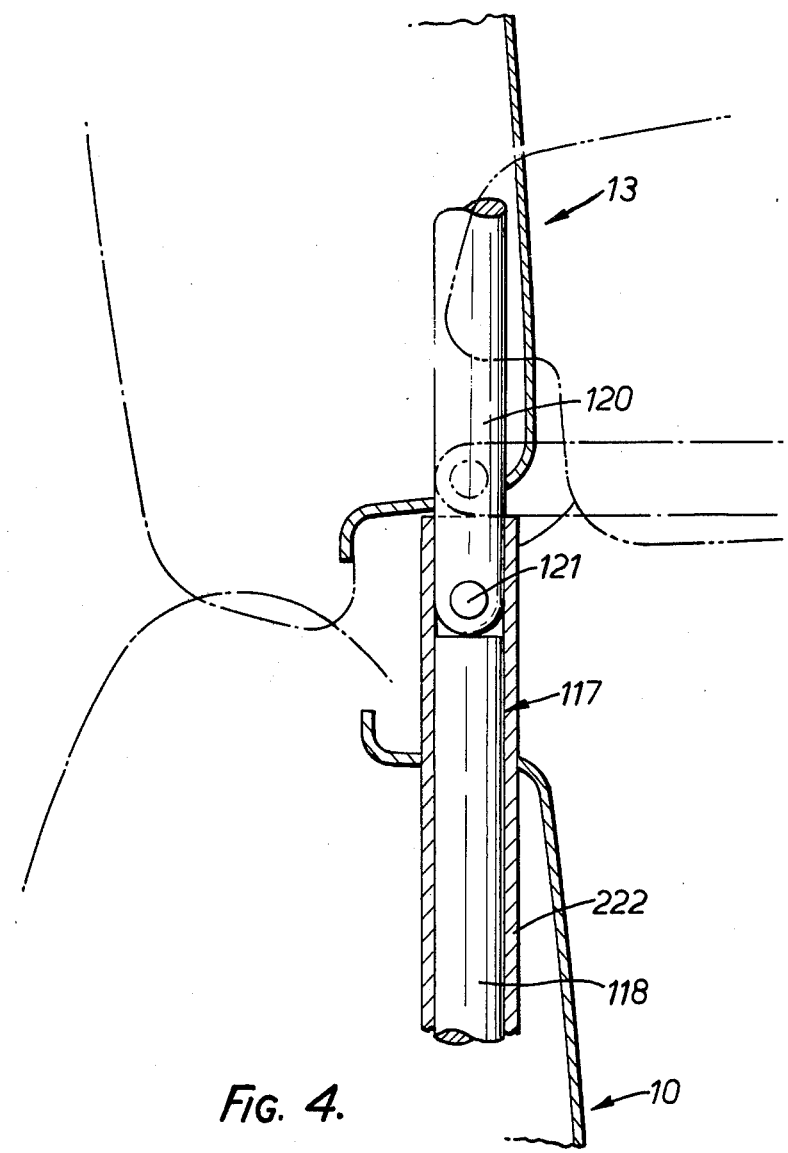

In the modified embodiment of FIG. 4 (in which like parts are referred to by the reference numerals used on FIGS. 1, 2 and 3) each pillar shank 117 which is formed as described in connection with the embodiment of FIG. 3, is mounted for longitudinal movement within a rigid support tube or sleeve 222 secured to the backrest pan, the pillar fitting closely within the tube 222. The length of the pillar shank is such that when it rests on the bottom of the support tube, or is otherwise fully inserted in the support tube 222, the hinge 121 is located within the upper end of the tube 222 and is thereby rendered inoperable. If however the shoulder support 13 is lifted to raise the upper shank portion 120 clear of the support tube 222, the shoulder support can be hinged rearwardly.

We claim:

1. A seat for a tractor or other vehicle, the seat having a backrest, a shoulder support and a hinge assembly including two laterally spaced hinge devices having a common hinge axis for mounting the shoulder support on the backrest for tilting movement from a normal position in which it forms an upward extension of the backrest to a backwardly-tilted position in which it forms a rest suitable, for example, for supporting an arm and shoulder of the seat occupant when reversing or plowing, each hinge device including a curved member integrally carried by said backrest and shoulder support for pivotal movement about said common hinge axis, said curved member having a detent aperture near one end which is adapted to receive the tip of said shank for securing the shoulder support in its normal position, said curved surface and aperture being mounted for vertical movement out of contact with the tip of said shank when said shoulder support is to be pivotally moved to its substantially horizontal position, and stop means at the other end of said curved surface for contacting the edge of the top of said shank member and limiting the pivotal movement of said shoulder support, each hinge device also including a pillar having a shank, a sleeve rotatable on the shank, means restricting movement of the sleeve longitudinally of the pillar, and a coupling carried by said sleeve and movable into locking engagement with the backrest in response to rotation of said sleeve, each hinge device further including locking means for locking the hinge device when the shoulder support is in a normal upright position, said locking means being releasable to permit the shoulder support to be tilted rearwardly about a common axis of said hinge devices to a substantially horizontal position in which it is supported by the hinge assembly, said locking means including a detent biased by a spring towards a locked position in which it secures a part of the shoulder support rigidly with respect to the backrest, but which is releasable by manually lifting the shoulder support away from the backrest against the force of the spring.

* * * * *